United States Patent [19]

Eggert et al.

[11] Patent Number: 5,001,779

[45] Date of Patent: Mar. 19, 1991

[54] MOUNTING ARRANGEMENT FOR MOTORCYCLE STEREO SYSTEM

[76] Inventors: Earl W. Eggert, 750 Edgelake Pt; William T. Dooley, 943 Manchester Cir., both of Schaumburg, Ill. 60194; Harold W. Irwin, 429 Ascot, Streamwood, Ill. 60107

[21] Appl. No.: 412,912

[22] Filed: Sep. 26, 1989

[51] Int. Cl.$^5$ .............................. H04B 1/08; B62J 9/00
[52] U.S. Cl. .................................... 455/346; 455/347; 455/351; 224/32 R; 312/7.1; 361/422
[58] Field of Search .................... 455/344–351; 361/380, 391, 394, 422; 381/86; 312/7.1, 246, 250; 224/32 A, 32 R, 35, 275

[56] References Cited

U.S. PATENT DOCUMENTS

| | | | |
|---|---|---|---|
| 4,303,184 | 12/1981 | Kloth | 224/32 R |
| 4,359,233 | 11/1982 | Jackson et al. | 280/289 A |
| 4,445,228 | 4/1984 | Bruni | 381/24 |
| 4,469,256 | 9/1984 | McEwen | 224/32 R |
| 4,473,251 | 9/1984 | Murayama | 296/78.1 |
| 4,750,658 | 6/1988 | Jennings | 224/27 S |

Primary Examiner—Gerard R. Strecker
Assistant Examiner—Chi H. Pham
Attorney, Agent, or Firm—Jon C. Gealow

[57] ABSTRACT

A package and a method for making the package for mounting a sound system on a motorcycle, which is easily attached and detached from the motorcycle is disclosed. The components of the sound system are generally surrounded by a cushioning filler and enclosed in a housing formed of a durable flexible fabric. The package is attached to the motorcycle by the magnetic force provided by magnets mounted in the bottom of the housing.

24 Claims, 3 Drawing Sheets

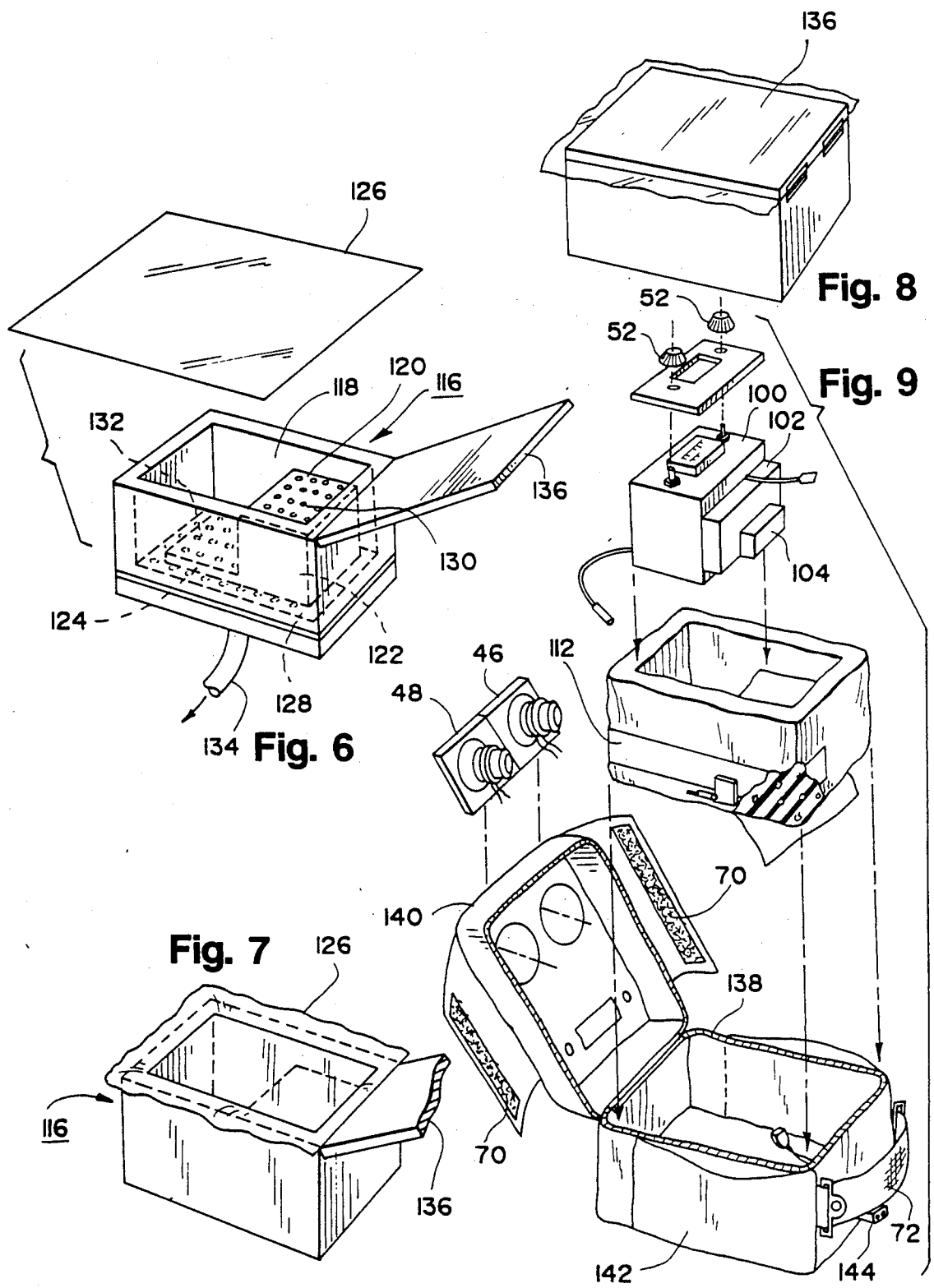

MOUNTING ARRANGEMENT FOR MOTORCYCLE STEREO SYSTEM

BACKGROUND OF THE INVENTION

1. Field of the Invention

This invention relates to an improved method for making a package and a package for mounting a sound system on a motorcycle.

2. Background Information

Various arrangements have been provided in the past for mounting radios and tape players on motorcycles. Some of these have included metal enclosures which were intended to be permanently attached to the motorcycle. Such permanently attached metal enclosures were intended to protect the components of the sound system which could include a radio, tape player, and speakers from physical damage and from the adverse effects of the environment. While intended to be permanently attached, such installations, due to their highly visible exposure were more often subject to theft than similar units installed within a locked automobile. A sound system designed for use on a motorcycle would not be as susceptible to theft, or deterioration due to the elements of weather if it could be readily removed from an unattended bike, and just as easily reattached for use. Not only is it desirable that the system be readily attached and detached, but it is also desirable that the system be contained in one package which is as small as possible, and is readily carried by a person to and from the bike. It is further desirable that the package protect the electronic components to the greatest extend possible from damage by bumping of the package and from the road shocks transmitted to the package while mounted on a bike which is traveling a rough road. Further, the components of the package, and the package itself should be readily manufactured and assembled.

SUMMARY OF THE INVENTION

Accordingly, it is an object of this invention to provide a method of packaging a sound system for use on a motorcycle which contains all of the components of the sound system in a compact package which protects the components from road shocks and the adverse effects of the environment, and which package is readily attached to and removed from the motorcycle. The components of the sound system are assembled in a compact arrangement with the necessary controls being accessible through openings provided in the package enclosure. The package enclosure is formed of a durable flexible material. Speakers are supported within the package so as to face toward the driver of the motorcycle. Due to the customary shape of the various components of the sound system, all of the space in the package is not occupied by components. The space which is void of sound system components is filled with a material such as foamed plastic, which not only helps to hold the components in position within the package, but also serves as a shock absorber between the components and the motorcycle housing. Magnets are provided in a wall of the package enclosure to secure the package to a steel portion of the cycle, such as the tank which is normally positioned directly in front of the motorcycle driver. Straps are secured to the package enclosure for carrying the sound system package when it is not attached to the cycle, and for securing the package to the cycle. Suitable wiring and electrical connectors extend from the housing for energizing components of the sound system from the cycle electrical system.

BRIEF DESCRIPTION OF THE DRAWINGS

FIG. 6 is a perspective view of the form and liner material used to make the formed filler;

FIG. 7 is a perspective view of the form and liner material of FIG. 6, with the liner material positioned in the form;

FIG. 8 is a perspective view of the form and liner material of FIG. 6 with the liner positioned in the form, and the cover closed after the filer material has been placed within the liner in the form;

FIG. 9 is an exploded perspective view of the sound package system of FIG. 1, showing the components of the sound system and the formed filler which are assembled in the flexible material enclosure.

DETAILED DESCRIPTION OF THE PREFERRED EMBODIMENT

Figure 1:
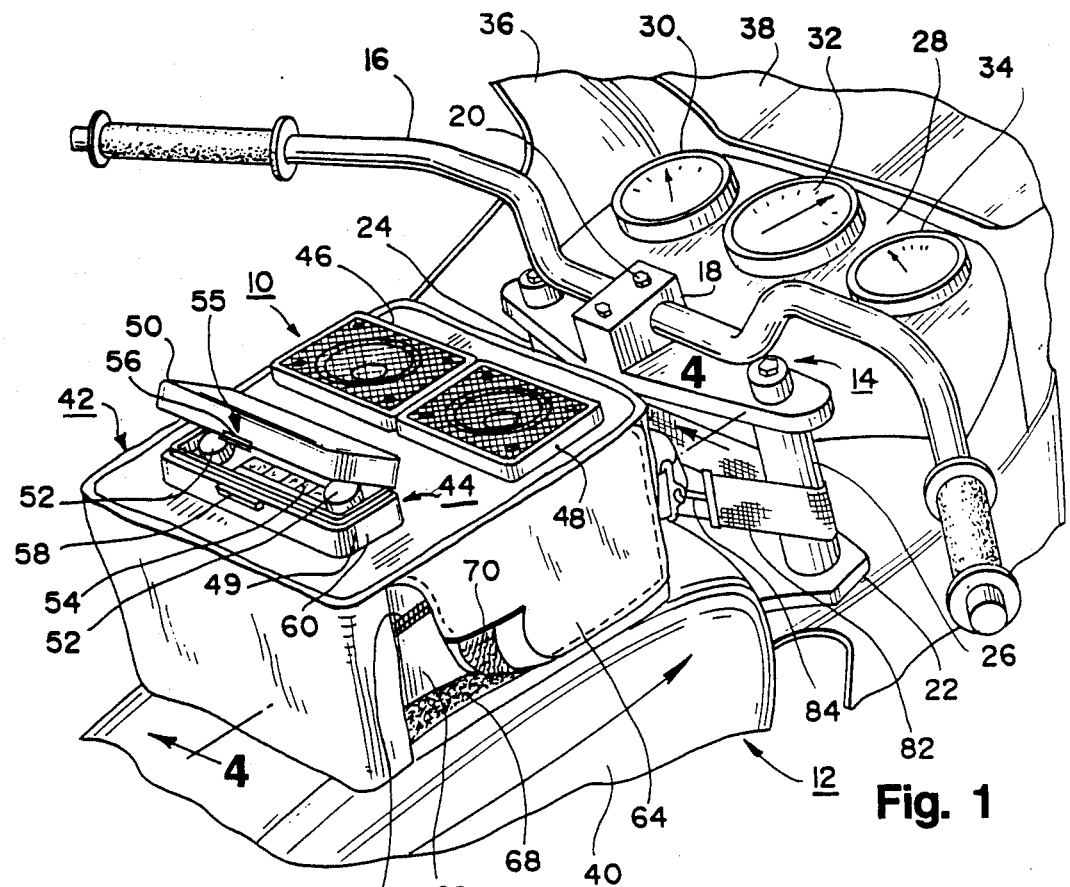
FIG. 1 is a perspective view of the sound system package, including a flexible material enclosure, mounted on a motorcycle in one position of normal use.

Referring to FIG. 1 of the drawings, a sound system package 10 constructed in accordance with this invention is shown mounted on a motorcycle 12, a portion of which is shown. The portion of the motorcycle shown is that which is located immediate in front of the rider. A portion of a steering assembly 14 of the motorcycle is shown. The portion shown includes the handle bars 16 which are secured to a supporting member 18 by a set screw 20. The supporting member 18 is in turn supported from a steering member 22 by a pair of upstanding rod-like members 24 and 26. Located in front of the steering assembly 14 is a instrument panel 28 having mounted thereon instruments 30, 32, and 34. Surrounding the front and sides of the instrument panel 28 is a cowling 36, which has mounted therein a windshield 38. Located behind the steering assembly 14 and generally in front of the seat for the motorcycle rider, which is seat is not shown, is a tank assembly 40. The tank assembly 40 typically encloses the fuel tank for the motorcycle, and also portions of the structural members interconnecting the front and rear wheels of the motorcycle.

The sound package 10 as constructed in accordance with this invention is formed as a generally rectangular housing 42. The rectangular housing is preferably formed of a durable flexible fabric which is resistant to the elements of weather and to abrasion. Extending from the upper or top surface of the housing 42, as mounted on the motorcycle 12, is a control assembly 44 for the stereo system, as well as a pair of speakers 46 and 48. The control assembly 44 is shown as being contained in a rectangular housing 49, having a hinged lid 50. The hinged lid is provided to cover the controls for the speaker system, which for purpose of illustration are shown as a pair of knobs 52 and a row of push buttons 54. In those cases where the sound system includes a tape player, the cover 50 would also cover the slot for receiving the tape. A clasp 55 having a first portion 56 formed on the cover 50, and a second portion 58 formed on a lower portion 60 of the housing 49 is provided to retain the cover 50 in a closed position.

Figure 2:
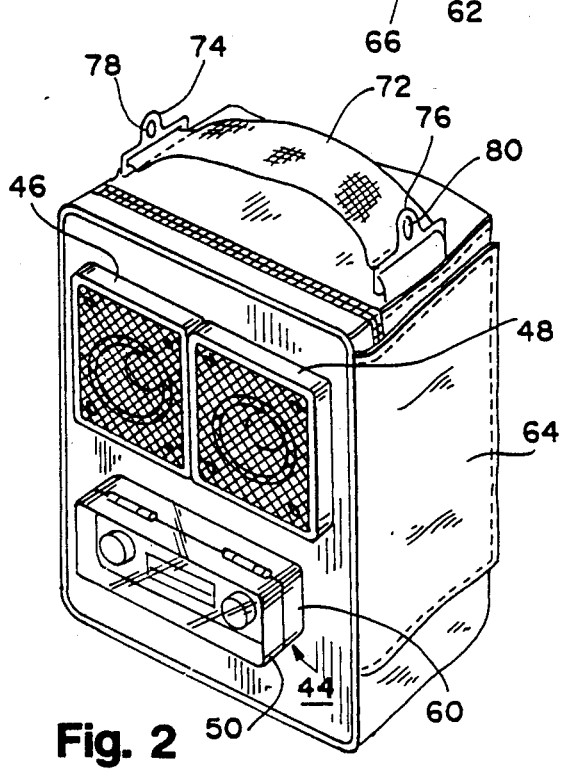
FIG. 2 is a perspective view of the sound system package of FIG. 1, with the package detached from the motorcycle, of the front and top of the package showing the portions of the sound system which project from the flexible enclosure.

As is best seen in FIGS. 1 and 2, pockets are provided on the sides of the rectangular housing 42. The pockets are formed between the sidewall of the housing 42 and an outer wall 62 preferably formed of the same material as the housing 42. A flap 64 is secured near the top edge of the housing 42 and extends over top edge 66 of the outer wall 62 of the pocket to provide a cover on the pocket. Fastening means such as interlocking strips 68 and 70 are provided on the outer surface of the outer wall 62 and on the inner surface of the flap 64 respectively to retain the cover in the closed position. These pockets, which are readily accessible to the motorcycle rider, are convenient for carrying tapes for use in the stereo system, or maps, or any other small item which the rider wishes to have readily at hand.

For convenience in carrying the sound system package when not attached to the motorcycle, a strap 72 is secured to the top of the housing 42. A pair of fasteners 74 and 76 provided with holes 78 and 80 respectively are secured to the strap 72. As shown in FIG. 1, a strap 82 having a hook at each end, one of which 84 is shown, is wrapped around the rodlike members 24 and 26 as an additional or supplemental way of securing the sound system package 10 to the motorcycle 12.

Figure 3:
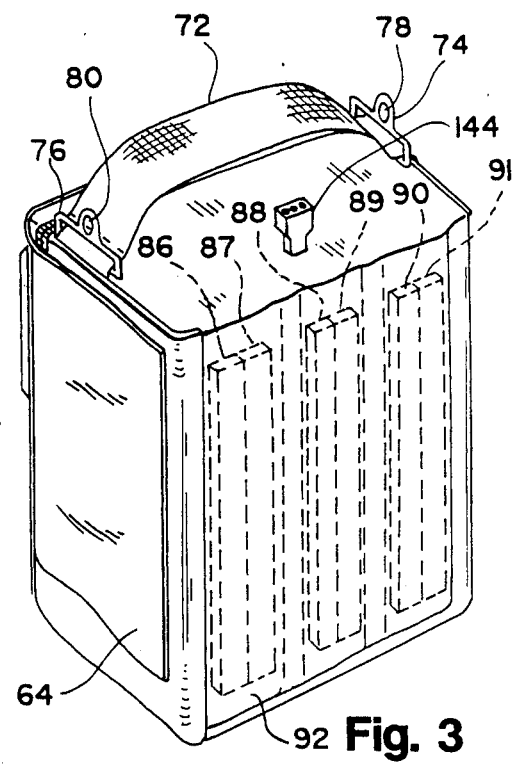
FIG. 3 is a perspective view of the sound system package of FIG. 1, with the package detached from the motorcycle, of the back and top of the package showing with dashed lines the permanent magnet strips which are provided in the package to hold the system on a motorcycle.
Figure 4:
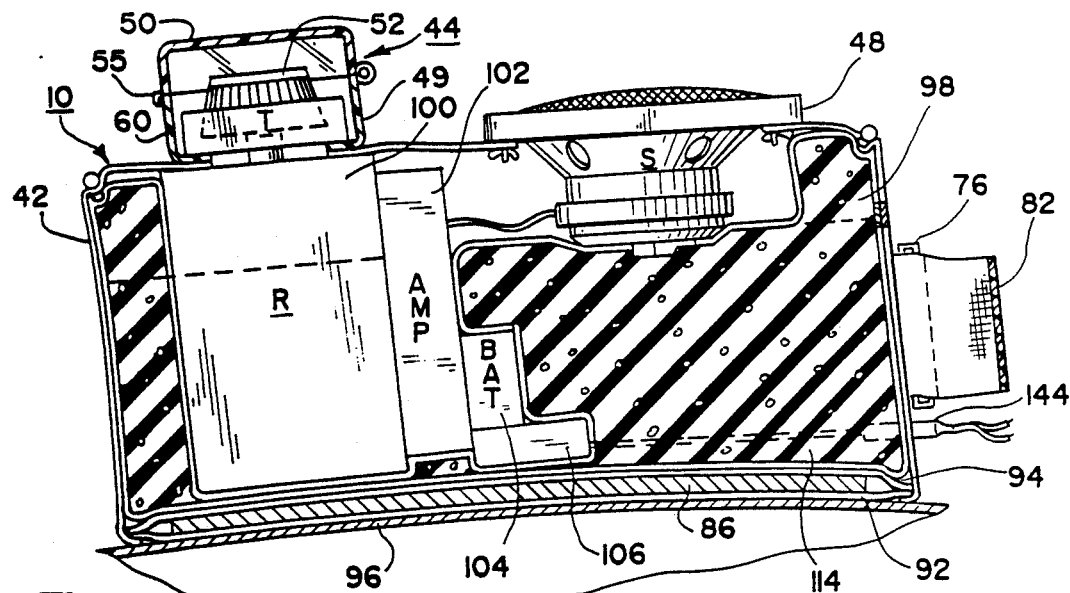
FIG. 4 is a cross-sectional view of the sound system package of FIG. 1" taken along the line 4—4 in FIG. 1.
Figure 5:
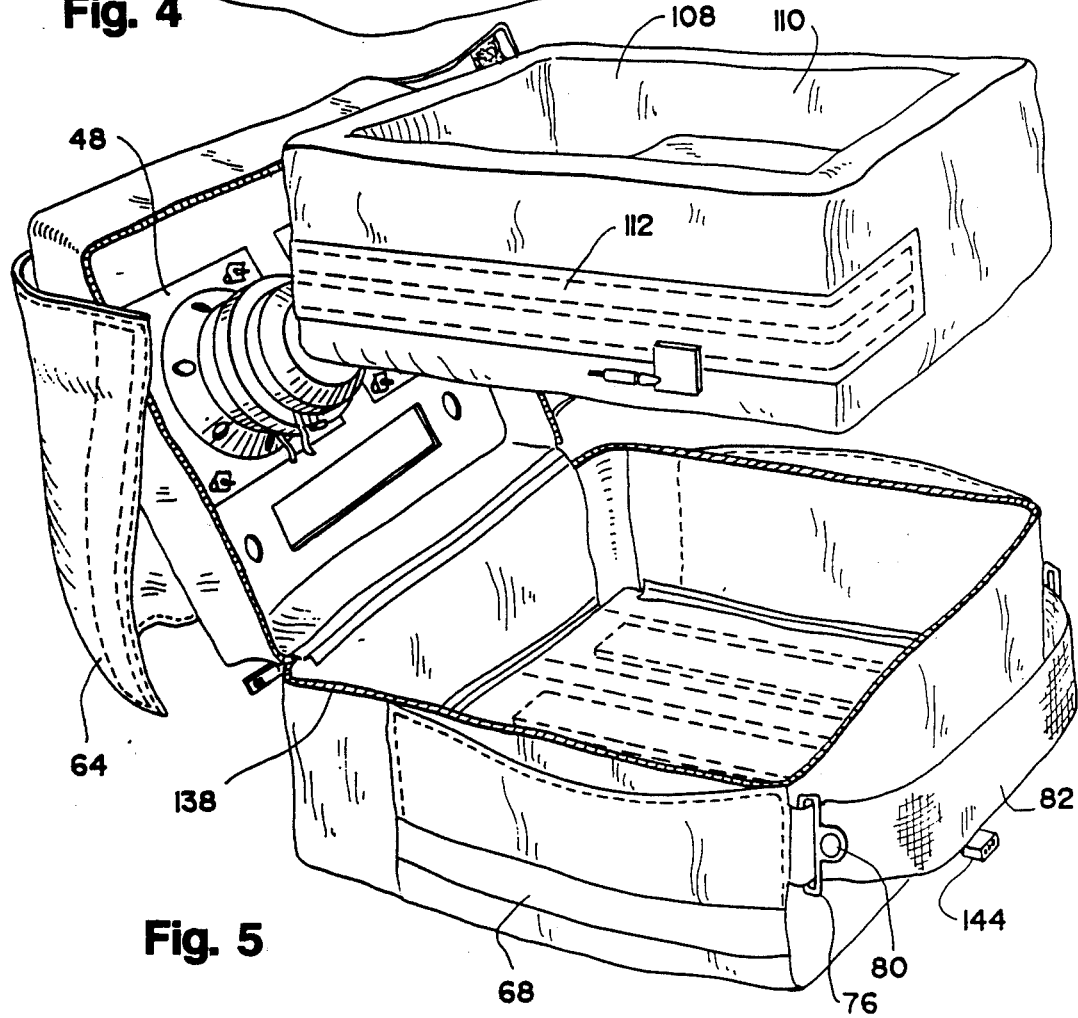
FIG. 5 is an exploded perspective view of the sound system package of FIG. 1, showing the formed filler removed from the flexible material enclosure.

The primary means for securing the sound system package 10 to the motorcycle is best shown in FIGS. 3, 4, and 5. As shown in these figures, six strip permanent magnets 86, 87, 88, 89, 90 and 91 are sown into pouches formed between the flexible material 92 forming the bottom of the housing, and a sheet of fabric 94 overlaying the magnets. The magnets 86 through 91 are attracted to the metallic tank cover 96, to hold the sound system package 10 in the desired position on the tank assembly 40. While the magnets 86 through 91 would provide the greatest holding force if they were to directly contact the tank surface 96, the thin flexible material 92, which in a preferred embodiment is a smooth vinyl material, is interposed therebetween to prevent the magnets from marring the surface of the tank.

As shown in the cross-section view of FIG. 4, which is taken along the line 4—4 in FIG. 1, the components of the sound system are received in pockets and depressions formed in a filler 98 provided in the rectangular housing 42.

The components of the stereo system, such as a tuner 100, amplifier 102, battery 104, connector 106, and tape player (if provided), are received in a deep pocket or depression 108, as shown in FIG. 5. The inner ends of speakers, one of which 48 is shown in FIG. 4, rest in a shallower pocket or depression 110, as shown in FIG. 5. The filler 98, the formation of which will be hereinafter described, has wrapped around it a loop-type antenna 112. As shown in FIG. 4, electrical wires 114 for connecting the stereo system to the motorcycle electrical system pass through holes formed in the filler 98.

Referring now to FIG. 6, the method of forming the filler 98 will be described. A mold housing 116 has inner walls 118 which form a rectangle which conforms in size and shape to that of the outer walls of the filler 98. A mold insert 120 is placed within the inner walls 118 and is spaced from them. The insert 120 has a portion 122 which conforms in shape to the deep pocket or depression 108 and portion 124 which conforms in shape to the shallower depression or pocket 110. A plastic sheet 126 is place over the mold housing 116. The bottom wall 128 of the mold housing 116, and the tops 130 and 132 of the portions 122 and 124 respectively of the insert are provided with apertures through which air may be drawn by a vacuum pump (not shown) attached to tube 134. With a vacuum applied to tube 134, the sheet 126 is drawn into the mold cavity to form a liner in the cavity as shown in FIG. 7. A foaming type plastic filler material is then placed in the lined cavity. With the filler material in the cavity, but prior to its foaming, portions of the liner extending outside of the cavity are folded over the top, and hinged cover 136 is closed. Thereafter, the resin material will foam or expand to fill the confined cavity to form the body of filler 98. Various types of plastics may be used to form the filler. A preferred form of plastic for the filler is a mixture of Urethane "A" and "B" components, one being a activator and the other a resin. After the foamed plastic filler has hardened, it along with the plastic liner 126, are removed from the mold housing 116 to provide the desired filler 98.

Referring to FIG. 9, the assembly of the sound system package will be described. The loop-type antenna 112 is secured, by suitable means such as by tape to the outer periphery of the filler 98. The components including tuner 100, amplifier 102, battery 104, and connector 106 are placed within the deep pocket 108, with the necessary electrical connections being made to the antenna and to the electrical wires 114 extending out of the sound system package 10 for connection to the motorcycle electrical system. The speakers 46 and 48 are secured to the cover of the rectangular housing 42 and electrically connected to the amplifier 102. A zipper 138 is provided for securing cover 140 to principal portion 142 of the rectangular housing 42.

When installing the sound system components in the housing, it may be necessary because of variations in the sizes and shape of one or more of the components, to use some small pieces of foam between the components and the inner walls of the cavities to secure the components in a fixed position. Taping or otherwise securing the sound system components, other than the speakers, to each other before placing them in the deep pocket or depression 108 will not only aid in the assembly of the sound system, but also provide a more structurally sound package.

To install the sound system package 10 for use on the motorcycle, it is only necessary to make an electrical connection between the motorcycle electrical system and a plug 144 provided on the end of the electrical wires 114 extending from the sound system, place the sound system so that the magnets 86 through 91 rest on the motorcycle tank cover 96, and clip the hooks on the safety strap 82 in holes 78 and 80 on the fasteners 74 and 76, respectively.

It should be apparent to those skilled in the art, that while what has been described is considered at present to be a preferred embodiment of the motorcycle sound system, in accordance with the patent statutes, changes may be made in the sound system without actually departing from the true spirit and scope of this invention.

The appended claims are intended to cover all such changes and modifications which fall within the true spirit and scope of this invention.

We claim:

1. A sound system for use on a motorcycle comprising:
   a housing constructed of durable flexible material, said housing including a top having a periphery, a bottom having a periphery, and a sidewall, said sidewall extending between the peripheries of said top and said bottom, said top and bottom being relatively flat,
   at least one magnet having a generally flat surface located on said bottom of said housing, said magnet being positioned such that when the sound system is placed on a motorcycle, said generally flat surface will be adjacent the tank of the motorcycle, said magnet being attracted by magnetic force to the tank of the motorcycle to releasable hold the sound system on the motorcycle,
   a filler, said filler being of the same general shape and size as said housing so as to fit snugly therein, one or more cavities and depressions formed in said filler,
   sound system electrical components located in said housing, at least one of said sound system electrical components being received in one or more of said preformed cavities and depressions in said filler,
   at least one of said sound system electrical components having a portion extending to said top of said housing, so as to be functionally available through said top of said housing for operation when the sound system is mounted for use on a motorcycle.

2. The sound system for use on a motorcycle of claim 1, wherein said housing includes a reclosable means for readily opening and reclosing said housing.

3. The sound system for use on a motorcycle of claim 2, wherein said reclosable means is a zipper in said sidewall of said housing.

4. The sound system for use on a motorcycle of claim 1, wherein said top and bottom have generally rectangular peripheries, and are generally parallel to each other.

5. The sound system for use on a motorcycle of claim 4, wherein said housing includes a reclosable means for readily opening and reclosing said housing.

6. The sound system for use on a motorcycle of claim 5, wherein said reclosable means is a zipper in said sidewall of said housing, said zipper being generally parallel to said top and bottom and being substantially coextensive with three sides of said top and said bottom.

7. The sound system for use on a motorcycle of claim 1, wherein said sound system electrical components include, an antenna which is secured to the outer surface of said filler so as to be contained within said housing.

8. The sound system for use on a motorcycle of claim 1, wherein said durable flexible fabric forming said top and said sidewall is resistant to the elements of weather and to abrasion.

9. The sound system for use on a motorcycle of claim 1, wherein said filler is made of a foamed plastic.

10. The sound system for use on a motorcycle of claim 9, wherein said filler includes an outer cover formed of at least one layer of a plastic sheeting.

11. The sound system for use on a motorcycle of claim 10, wherein said filler includes a principal portion formed in a mold lined with said at least one layer of a plastic sheeting, said mold being formed to provide one or more of said cavities and depressions in said filler to receive said sound system electrical components.

12. The sound system for use on a motorcycle of claim 1, wherein said durable flexible material forming said bottom of said housing is formed of a material which is smooth and thin such that said at least one magnet will exert sufficient magnetic force through said bottom to releasable hold the sound system on the motorcycle.

13. The sound system for use on a motorcycle of claim 1, wherein at least one aperture is formed in said top of said housing, each one of said portions of said sound system electrical components extending to said top of said housing extending through one of said apertures formed in the top of said housing.

14. The sound system for use on a motorcycle of claim 13, wherein said sound system electrical components include, a tuner having controls, and at least one speaker having a sound emitting portion, said portions of said sound system electrical components extending through said apertures formed in the top of said housing include said controls of said tuner, and said sound emitting portion of said speaker.

15. The sound system for use on a motorcycle of claim 14, wherein said at least one speaker is secured to said top of said housing, with said sound emitting portion of said speaker being located outside of said housing.

16. The sound system for use on a motorcycle of claim 14, wherein an openable cover is provided over the controls of said tuner to protect the controls from adverse weather conditions.

17. The sound system for use on a motorcycle of claim 16, wherein said openable cover includes a hinged lid which may be pivoted between a closed position and an open position to gain access to said controls of said tuner.

18. The sound system for use on a motorcycle of claim 1, wherein at least one pocket is formed in the bottom of said housing for receiving said at least one magnet, whereby said durable flexible material is interposed between said magnet and the tank of the motorcycle such that said magnet is positioned to be attracted by magnetic force to the tank of the motorcycle to releasable hold the sound system on the motorcycle without said magnet directly contacting the tank so as to prevent scratching or marring of the tank by the magnet.

19. The sound system for use on a motorcycle of claim 18, wherein three pockets are formed in the bottom of said housing, each of said pockets receiving two generally rectangular magnets, whereby said magnets provide an attracting magnetic force to the tank of the motorcycle over a substantial portion of the area of the bottom of the housing to releasable hold the sound system on the motorcycle.

20. The sound system for use on a motorcycle of claim 1, wherein said sound system electrical components include, a tuner, a tape player, an audio amplifier, a pair of stereo speakers, and necessary electrical conductors for connecting said electrical components to each other and to the electrical system of the motorcycle to derive electrical power therefrom.

21. The sound system for use on a motorcycle of claim 1, wherein a portion of said filler is located between said sound system electrical components received in one or more of said cavities and depressions which are preformed in said filler and said bottom of said housing, so as to provide a somewhat resilient cushion between said electrical components and the tank of the motorcycle.

22. The sound system for use on a motorcycle of claim 1, wherein at least one pocket is formed on the outside of said sidewall for receiving and holding articles, said at least one pocket having an open side, a flap having an edge attached to said housing adjacent the open side of said pocket and a free edge, means for releasably securing the free edge of said flap in a position to close said pocket.

23. The sound system for use on a motorcycle of claim 1, wherein a carrying strap is secured to said housing for carrying said housing when said housing is detached from a motorcycle.

24. The sound system for use on a motorcycle of claim 1, wherein a pair of attaching means are secured to said housing, and a safety securing means is provided which when engaged with said pair of attaching means supplies a safety securing of said housing to the motorcycle.

* * * * *